United States Patent [19]

Lim et al.

[11] Patent Number: 5,488,759
[45] Date of Patent: Feb. 6, 1996

[54] DETACHABLE CLIP FOR A PORTABLE ELECTRONIC DEVICE

[75] Inventors: Kim Y. Lim; Poh C. Tan, both of Singapore, Singapore; Moo H. Hon, Kulai, Mali

[73] Assignee: Motorola, Inc., Schaumburg, Ill.

[21] Appl. No.: 281,948

[22] Filed: Jul. 28, 1994

[51] Int. Cl.$^6$ .................................................. H04B 1/08
[52] U.S. Cl. ........................... 24/3.12; 24/458; 455/348; 455/351
[58] Field of Search .................. 24/458, 457, 11 F, 24/3.11, 3.12, 3.1; 224/252, 269, 271, 272; 455/348, 351

[56] References Cited

U.S. PATENT DOCUMENTS

| | | | |
|---|---|---|---|
| 1,412,938 | 4/1922 | Halket | 24/11 F X |
| 4,083,481 | 4/1978 | Selinko. | |
| 4,419,794 | 12/1983 | Horton, Jr. et al. | 224/272 X |
| 4,605,335 | 8/1986 | Otrusina | 24/3.12 X |
| 5,081,709 | 1/1992 | Benyo. | |
| 5,185,906 | 2/1993 | Brooks. | |
| 5,261,122 | 11/1993 | Otsuki et al. | 224/252 X |

FOREIGN PATENT DOCUMENTS 2856493  7/1979  Germany ..................... 24/458

*Primary Examiner*—James R. Brittain
*Attorney, Agent, or Firm*—D. Andrew Floam

[57] ABSTRACT

A latch for affixing a clip (102) onto a housing (104) that encloses a portable electronic device. The latch, integrally molded with the clip (102), comprises a bar (208) disposed within an aperture (210) having a circumferential edge (212). The bar (208) includes a stub extrusion (214) that is disposed distally and perpendicularly at an unaffixed first end (216), and connects to the circumferential edge (212) at an affixed second end (218). Reinforcing the bar (208) and the stub extrusion (214) laterally on a first side (224) is a first flange (220). A second flange (222) reinforces the bar 208 laterally on a second side (226) that is opposite to the first side (224). The stub extrusion (214) affixes the clip to the housing by engaging a catch extrusion (110) and a slot (112) disposed on the housing (104).

17 Claims, 3 Drawing Sheets

DETACHABLE CLIP FOR A PORTABLE ELECTRONIC DEVICE

FIELD OF THE INVENTION

This invention relates in general to clips for attaching an electronic device to a person's clothing and in particular to a detachable clip for fastening a portable electronic device to a users apparel.

BACKGROUND OF THE INVENTION

Electronic devices, such as pagers used in a paging communication system, are constantly developed to improve their functionality. A major area of constant development is portability.

To improve portability, different methods of carrying an electronic device are considered. One method of carrying a portable electronic communication device, for example, is with a clip affixed to a housing that encloses the portable electronic communication device. Using the clip, the portable electronic communication device is then attached to an article of clothing worn by a user of the portable electronic communication device. For example, a pager subscriber can attach a subscribed pager to a waist belt or a pocket edge.

Typically, the clip is a strip of resin or metal with a hinge joint that is formed with various parts such as springs, collars, and pins. Assembling the clip with these parts and affixing it to a housing adds manufacturing costs to the portable electronic communication device in terms of parts and labor. In addition, these parts are delicate and subjecting them to usage wear and tear causes problems of part durability. Furthermore, users of the portable electronic communication device will find it desirable to actively decide whether to use or not use the clip.

Thus, what is needed is an apparatus to provide a durable, cost effective, and optional clip for portable electronic devices such as pagers.

SUMMARY OF THE INVENTION

In carrying out the objects of the present invention in one form, there is provided a latch comprising a bar that is integrally molded with a clip for affixing the clip to a housing. The bar includes a stub extrusion for engaging a slot and a catch extrusion on the housing, and a first flange for reinforcing the stub extrusion on a first side of the bar.

DETAILED DESCRIPTION OF THE PREFERRED EMBODIMENT

Figure 1:
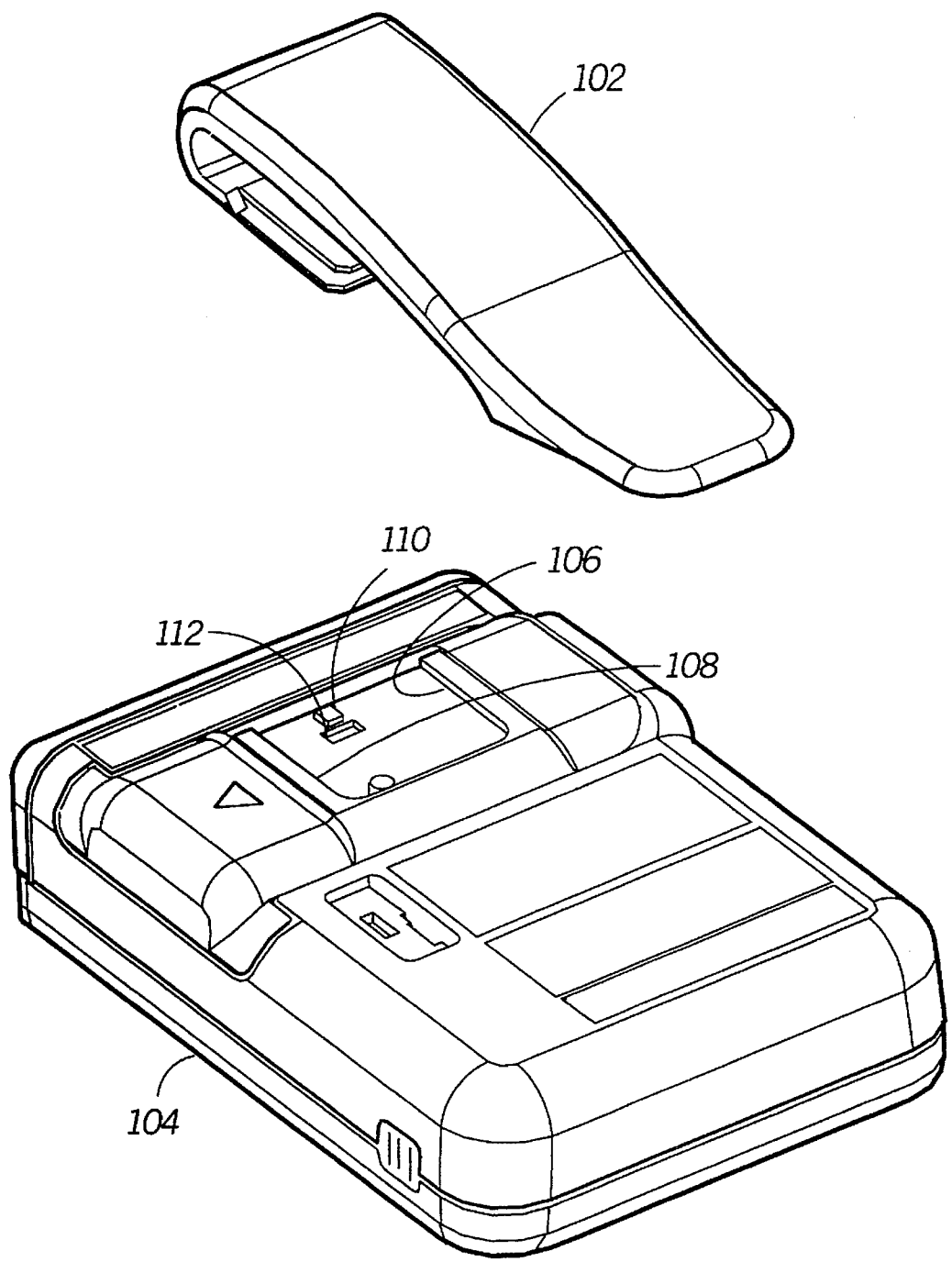
FIG. 1 is a perspective view of a clip and a housing in accordance with a preferred embodiment of the present invention.
Figure 2:
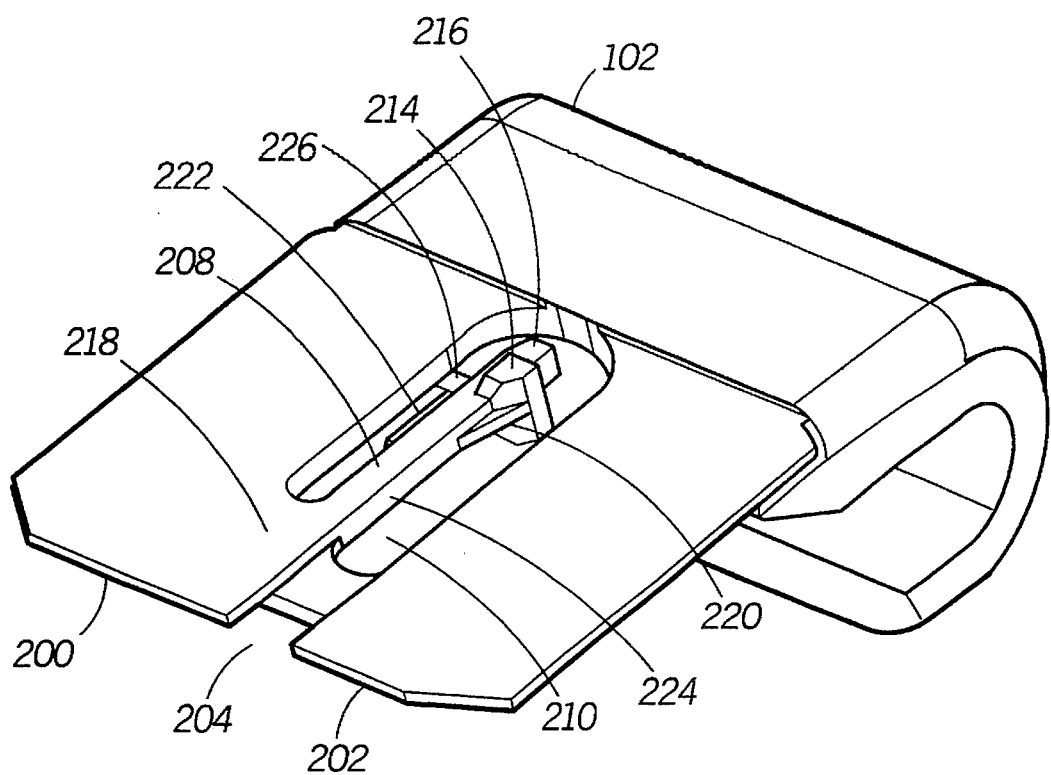
FIG. 2 is a perspective view of the clip of FIG. 1 showing a latch in accordance with the preferred embodiment of the present invention.

In accordance with a preferred embodiment of the present invention, FIG. 1 shows a clip 102 and a housing 104 that encloses electronic circuitry for a portable electronic communication device. The clip 102 affixes to the housing 104 by slidably inserting along two flange channels 106,108 to engage a catch extrusion 110 and a slot 112 on the housing 104. Two peripheral flanges 200,202 on a boundary edge of the clip 102 for slidably inserting onto the two flange channels 106,108 of the housing 104 are provided as shown in FIG. 2, in accordance with the preferred embodiment of the present invention. A notch 204, separating the two peripheral flanges 200,202 allows the passage of the catch extrusion 110 when affixing the clip 102 onto the housing 104.

To enable a secure engagement of the clip 102 to the housing 104, the clip 102 includes a latch. The latch comprises a bar 208 that is disposed proximally within an aperture 210 formed by a circumferential edge 212 within the clip 102. Integrally molded with the clip 102, the bar 208 includes a stub extrusion 214 disposed distally and perpendicularly at an unaffixed first end 216 and shown in FIG. 2 in accordance with the preferred embodiment of the present invention. The bar 208 connects integrally to the circumferential edge 212 at an affixed second end 218. Further disposed on the bar 208 and reinforcing it laterally are two flanges, a first flange 220 and a second flange 222. The first flange 220 is disposed on a first side 224 of the bar 208, extending laterally from the first side 224 and widening towards the unaffixed first end 216 to reinforce the stub extrusion 214. Disposed on a second side 226 of the bar 208, opposite to the first side 224, is the second flange 222. The stub extrusion 214, the first flange 220, and the second flange 222 are integrally molded with the bar 208.

Advantageously integrating the latch with the clip 102 in the present invention allows the clip 102 to be easily affix to the housing 104. Unlike a conventional clip, no other parts are needed to form a joint that affixes the conventional clip to a housing.

Figure 3:
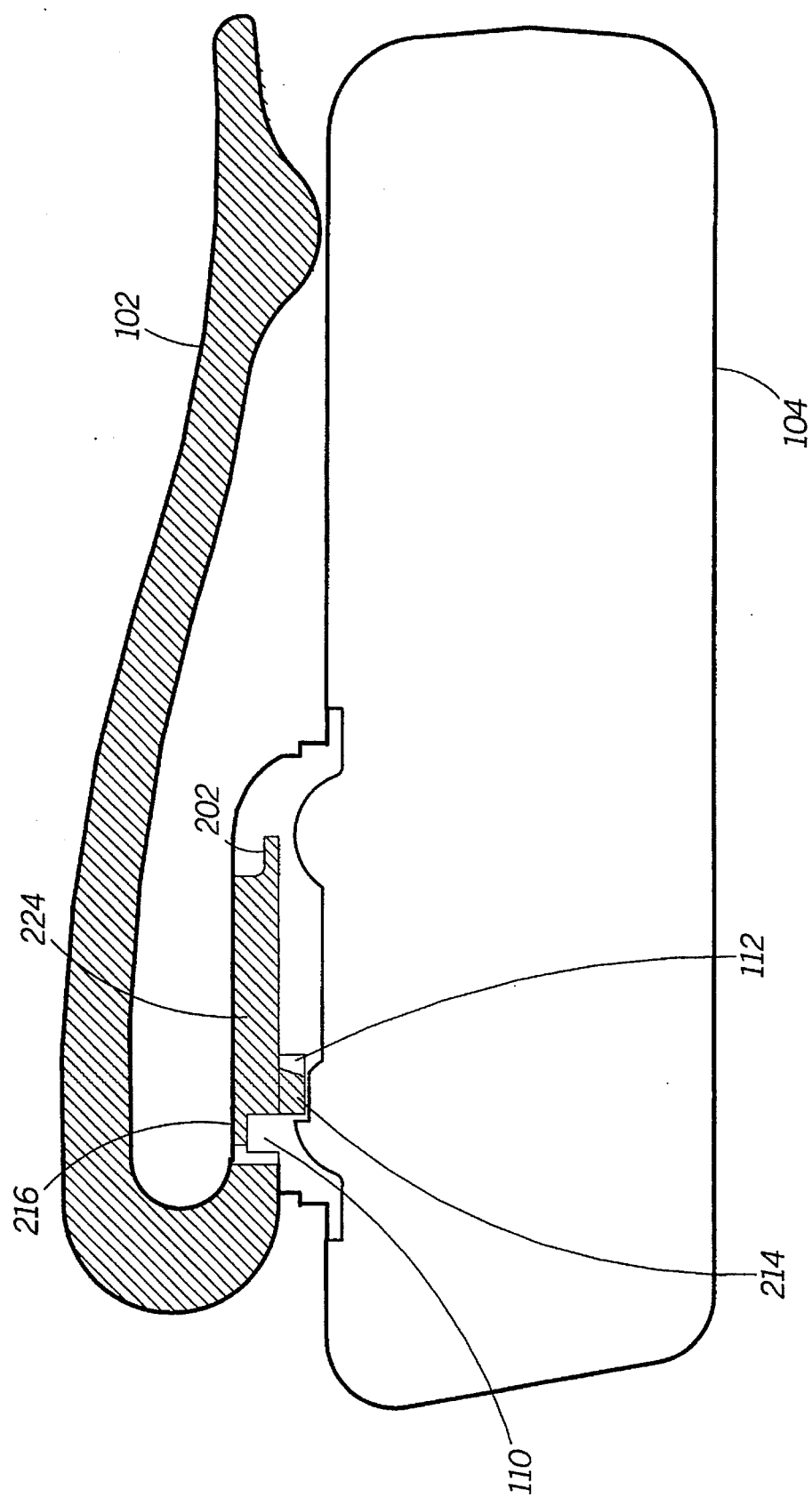
FIG. 3 is a side view of the clip of FIG. 1 and illustrating the clip engaging the catch extrusion and the slot in accordance with the preferred embodiment of the present invention.

FIG. 3 shows a mid-section perspective of the latch securing to the housing 104 in accordance with the preferred embodiment of the present invention. The stub extrusion 214 sits into the slot 112, and reinforced by the first flange 220, locks onto the catch extrusion 110. Having this engagement of the stub extrusion 214 to the catch extrusion 110 and the slot 112 provides a secure fastening of the clip 102 to the housing 104.

Providing a user of the portable electronic communication device with the present invention allows a firm and yet detachable apparatus for affixing and unaffixing the clip 102 to the portable electronic communication device. Unaffixing the clip 102 from the housing 104 is easily accomplished by laterally exerting pressure on the bar 208 at the first side 224 to disengage the stub extrusion 214 from the catch extrusion 110. No special tool is required for this unaffixing. Any available device that can exert pressure laterally on the first flange 220 or the stub extrusion 214, disengage the stub extrusion 214 from the catch extrusion 110, and push the clip 102 out of the housing 104 along the flange channels is sufficient. Hence, a user of the portable electronic communication device embodying the present invention will find it easier to actively decide not to have the clip 102 by unaffixing it.

Using only one singularly molded part, the clip 102 embodying the present invention requires no extraneous assembly and, therefore, has a lower manufacturing cost in terms of parts and labor compared with the assembly of a conventional clip. Additionally, concerns on usage wear and tear arising from stress on the clip 102 at the bar 208 is countered by having the bar 208 reinforced laterally by the two flanges 220,222, with the first flange 220 further reinforcing the stub extrusion 214. Easily unaffixing the clip 102 from the housing 104 also requires no special tools and provides a desirable alternative to a user of the portable electronic communication device to not have the clip 102. Therefore, the present invention advantageously provides a durable, cost effective, and optional clip for portable electronic communication devices such as selective call receivers and pagers.

By now it should be appreciated that there has been provided a novel apparatus for affixing a clip 102 onto a housing 104 for portable electronic communication devices such as selective call receivers and pagers.

What is claimed is:

1. In combination, a housing having a catch extrusion and a slot, and a clip comprising an aperture having an circumferential edge, and a latch integrally molded with the clip for affixing the clip to the housing, the latch comprising:
   a bar disposed within the aperture having a first side and a second side and first and second ends, the bar comprising:
      a stub extrusion for engaging the catch extrusion and the slot; and
      a first flange for reinforcing the stub extrusion on the first side of the bar wherein the first flange extends laterally from the first side of the bar into the aperture.

2. The combination of claim 1 wherein the second end of the bar is proximal and is affixed to the circumferential edge and the first end of the bar is distal and unaffixed.

3. The combination of claim 2 wherein the stub extrusion is disposed at the unaffixed first end of the bar and extends perpendicularly therefrom.

4. The combination of claim 1 wherein the housing is suitable for enclosing a portable electronic device.

5. The combination of claim 1 wherein the bar comprises a second flange integrally molded with the bar for reinforcing said bar wherein the second flange extends laterally from the second side of the bar into the aperture.

6. The combination of claim 1, wherein the first side and the second side of the bar are oppositely facing.

7. In combination, electronic circuitry, a housing which encloses the electronic circuitry and which includes a catch extrusion and a slot, and a clip suitable for attaching the housing onto apparel worn by a user, the clip comprising:
   an aperture having a circumferential edge;
   a bar integrally molded with the clip and disposed within the aperture formed by the circumferential edge of the clip, the bar comprising:
      first and second sides;
      a stub extrusion for engaging the catch extrusion and the slot; and
      a first flange for reinforcing the stub extrusion and the bar on the first side wherein the first flange extends from the first side of the bar into the aperture.

8. The combination of claim 7 wherein the electronic circuitry comprises selective call receiver electronic circuitry.

9. The combination of claim 7 wherein the bar comprises a distal first end which is unaffixed and a proximal second end.

10. The combination of claim 9 wherein the stub extrusion is disposed distally and perpendicularly at the first end of the bar.

11. The combination of claim 9 wherein the bar is connected at its second end to the circumferential edge.

12. The combination of claim 7 wherein the bar further comprises a second flange disposed laterally on the second side and integrally molded with the clip for reinforcing said bar.

13. The combination of claim 12 wherein the first side and the second side are oppositely facing.

14. A portable electronic device having electronic circuitry, the portable electronic device comprising:
   a housing enclosing the electronic circuitry, the housing comprising:
      a catch extrusion; and
      a slot;
   a clip for attaching the housing onto apparel, the clip comprising:
      first and second sides;
      a first distal end which is unaffixed;
      an aperture having a circumferential edge;
      a bar integrally molded with the clip and disposed within an aperture formed by a circumferential edge of said clip, the bar comprising:
         a stub extrusion disposed at the first distal end of the bar and extending perpendicularly therefrom for engaging the catch extrusion and the slot; and
         a first flange for reinforcing the stub extrusion and the bar on the first side wherein the first flange extends laterally from the first side of the bar into the aperture.

15. The portable electronic device of claim 14 wherein the electronic circuitry comprises a selective call receiver circuitry.

16. The portable electronic device of claim 14 wherein the bar comprises a proximal second end which is connected to the circumferential edge.

17. In combination, a housing suitable for enclosing an electronic device, the housing having a catch extrusion, a slot and two flange channels; a clip having a boundary edge with two peripheral flanges suitable for slidably inserting the clip onto the two flange channels of the housing and an aperture having a circumferential edge; a latch integrally molded with a clip for affixing the clip to the housing, the latch comprising:
   a bar disposed within the aperture and having a first distal end which is unaffixed and a second proximal end which is affixed to the circumferential edge, the bar comprising:
      a stub extrusion disposed at the first end of the bar and extending perpendicularly therefrom for engaging the catch extrusion and the slot;
      a first flange for reinforcing the stub extrusion and the bar on the first side wherein the first flange extends laterally from the first side of the bar into the aperture; and
      a second flange laterally reinforcing the bar on the second side wherein the second flange extends laterally from the second side of the bar into the aperture.

\* \* \* \* \*